United States Patent
Ma et al.

(10) Patent No.: US 12,165,204 B2
(45) Date of Patent: *Dec. 10, 2024

(54) MOBILE SECURITIES TRADING PLATFORM

(71) Applicant: TASTYTRADE, INC., Chicago, IL (US)

(72) Inventors: Linwood Ma, Chicago, IL (US); Kristi Ross, Oak Park, IL (US); Tom Sosnoff, Chicago, IL (US)

(73) Assignee: TASTYTRADE, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,518

(22) Filed: Aug. 22, 2023

(65) Prior Publication Data

US 2023/0394575 A1 Dec. 7, 2023

Related U.S. Application Data (63) Continuation of application No. 17/316,313, filed on May 10, 2021, now Pat. No. 11,756,121, which is a continuation of application No. 16/834,636, filed on Mar. 30, 2020, now Pat. No. 11,004,149, which is a continuation of application No. 14/883,266, filed on Oct. 14, 2015, now abandoned.

(60) Provisional application No. 62/063,695, filed on Oct. 14, 2014.

(51) Int. Cl.
G06Q 40/00 (2023.01)
G06Q 40/04 (2012.01)
G09B 5/06 (2006.01)

(52) U.S. Cl.
CPC .............. *G06Q 40/04* (2013.01); *G09B 5/06* (2013.01)

(58) Field of Classification Search
CPC .................................. G06Q 40/04; G06B 5/06
USPC ................... 705/39, 37, 38, 40, 45, 26, 7.29; 715/810, 744; 709/224; 703/6, 1; 701/2, 120; 235/378, 380; 700/106, 98; 702/186
See application file for complete search history.

(56) References Cited

U.S. PATENT DOCUMENTS 6,166,729 A * 12/2000 Acosta ................... H04L 69/16
348/E7.063
7,406,427 B1 * 7/2008 Guyan .................. G06Q 40/08
707/999.01

(Continued)

OTHER PUBLICATIONS

Global Online Trading System (GoTrade); 2007 IEEE Systems and Information Engineering Design Symposium (pp. 1-6); G.Cuevas, M. Dale, A. Idrisu, J. Lee, G. Donohue, A. Loerch, M. Parodi; Apr. 1, 2007. (Year: 2007).*

(Continued)

*Primary Examiner* — Tien C Nguyen
(74) *Attorney, Agent, or Firm* — Patzik, Frank & Samotny Ltd.

(57) ABSTRACT

A mobile securities trading platform interface may include a mobile order entry portion, a mobile portfolio view portion, a mobile stock price view portion, an investment education video programming portion (which may also be provided on a non-mobile version of the platform), and a portion for following trades of other users on the platform (which may also be provided on a non-mobile version of the platform).

18 Claims, 8 Drawing Sheets

(56) References Cited

U.S. PATENT DOCUMENTS

| | | | |
|---|---|---|---|
| 7,430,514 B1* | 9/2008 | Childress | G06Q 40/08 705/2 |
| 7,480,715 B1* | 1/2009 | Barker | H04L 63/1416 709/224 |
| 7,627,517 B2* | 12/2009 | Badenhorst | G06Q 40/04 705/37 |
| 7,689,442 B2* | 3/2010 | Childress | G06Q 40/08 704/2 |
| 7,720,742 B1* | 5/2010 | Mauro | G06Q 40/03 705/37 |
| 7,752,123 B2* | 7/2010 | Brookfield | G06F 9/52 705/37 |
| 7,797,226 B2* | 9/2010 | Ram | G06F 40/18 705/37 |
| 7,809,587 B2* | 10/2010 | Dorai | G06Q 10/10 703/8 |
| 7,827,091 B2* | 11/2010 | Cutler | G06Q 40/00 705/37 |
| 7,889,931 B2* | 2/2011 | Webb | G01N 21/8851 382/209 |
| 7,908,199 B2* | 3/2011 | Neff | G06Q 40/10 705/37 |
| 7,953,615 B2* | 5/2011 | Aquila | G06Q 40/08 705/2 |
| 8,239,220 B2* | 8/2012 | Kidd | G01C 11/06 705/305 |
| 8,265,963 B1* | 9/2012 | Hanson | G06Q 10/10 705/5 |
| 8,346,578 B1* | 1/2013 | Hopkins, III | G06Q 30/02 705/14.66 |
| 8,374,957 B1* | 2/2013 | Garcia | G06Q 20/405 705/40 |
| 8,527,305 B1* | 9/2013 | Hanson | G06Q 10/10 705/5 |
| 8,537,338 B1* | 9/2013 | Medasani | G01S 7/4802 382/104 |
| 8,543,486 B2* | 9/2013 | Donoho | G06Q 40/04 705/37 |
| 8,630,820 B2* | 1/2014 | Amis | G08B 25/016 702/186 |
| 8,799,034 B1* | 8/2014 | Brandmaier | G07C 5/008 705/4 |
| 9,600,843 B2* | 3/2017 | Creamer | G06T 19/20 |
| 9,811,859 B2* | 11/2017 | Kemp, II | G06Q 20/10 |
| 2002/0007225 A1* | 1/2002 | Costello | G06Q 30/0643 700/106 |
| 2002/0055861 A1* | 5/2002 | King | G06Q 40/08 705/4 |
| 2003/0154111 A1* | 8/2003 | Dutra | G06Q 30/0283 705/400 |
| 2004/0088198 A1* | 5/2004 | Childress | G06Q 40/02 705/4 |
| 2004/0243423 A1* | 12/2004 | Rix | G06Q 10/10 705/400 |
| 2005/0080649 A1* | 4/2005 | Alvarez | G06Q 40/08 705/322 |
| 2008/0091490 A1* | 4/2008 | Abrahams | G06Q 40/08 705/30 |
| 2008/0255887 A1* | 10/2008 | Gruter | G06Q 40/08 705/4 |
| 2009/0002364 A1* | 1/2009 | Witte, II | G06V 20/647 345/419 |
| 2009/0027253 A1* | 1/2009 | van Tooren | G08G 5/045 342/29 |
| 2009/0055226 A1* | 2/2009 | Tritz | G06Q 30/0283 705/400 |
| 2009/0265193 A1* | 10/2009 | Collins | G06Q 30/0185 901/46 |
| 2010/0235273 A1* | 9/2010 | Friesen | G06Q 30/08 705/37 |
| 2010/0250022 A1* | 9/2010 | Hines | G05D 1/0094 701/2 |
| 2010/0302359 A1* | 12/2010 | Adams | H04L 1/0017 375/240.01 |
| 2011/0137443 A1* | 6/2011 | Farahani | G06F 30/15 700/98 |
| 2011/0161118 A1* | 6/2011 | Borden | G06Q 50/22 705/4 |
| 2012/0033821 A1* | 2/2012 | Ohta | G10K 11/17857 381/71.1 |
| 2012/0071998 A1* | 3/2012 | Davies | G06V 20/653 700/98 |
| 2012/0140041 A1* | 6/2012 | Burgunder | G01B 11/24 348/46 |
| 2012/0210853 A1* | 8/2012 | Abershitz | B64F 1/04 89/1.11 |
| 2012/0250010 A1* | 10/2012 | Hannay | G01N 21/952 356/237.1 |
| 2012/0303336 A1* | 11/2012 | Becker | B64F 5/00 703/1 |
| 2013/0226624 A1* | 8/2013 | Blessman | H04N 7/181 705/4 |
| 2014/0163852 A1* | 6/2014 | Borri | G08G 5/0034 701/120 |
| 2014/0244078 A1* | 8/2014 | Downey | H05K 3/32 29/832 |
| 2016/0189303 A1* | 6/2016 | Fuchs | G06Q 40/08 705/4 |

OTHER PUBLICATIONS

A retail investor's perspective on the acceptance of Internet stock trading; 36th Annual Hawaii International Conference on System Sciences, 2003. Proceedings of the (Page(s): 11 pp.); J.E. Lee-Partridge, Pei See Ho; Jan. 6, 2003. (Year: 2003).*

Context-Aware for Smartphone Sensing in Over-the-Counter Market; Ambient Intelligence in Mobile Stock Markets; 2013 Seventh International Conference on Innovative Mobile and Internet Services in Ubiquitous Computing (pp. 641-646); Mu-Yen Chen; Jul. 1, 2013. (Year 2013).

Financial Advisor Agent in a Mult-Agent Financial Trading System; 11th International Workshop on Database and Expert Systems Applications (2000); (pp. 482-486); Vikrant Pandey, Wee-Keong Ng, Ee-Peng Lim; Jan. 1, 2000. (Year 2000).

Towards a Multi-Agent Based Architecture to Simulate the Reality of a Stock Exchange Market; 2010 International Conference on Computer Systems and Applications; (pp. 1-8); Sehl Mellouli, Faouzi Bouslama; May 1, 2010 (Year 2010).

* cited by examiner

MOBILE SECURITIES TRADING PLATFORM

PRIORITY STATEMENT

The present application claims priority to U.S. Non-Provisional application Ser. No. 17/316,313 filed May 10, 2021, U.S. Non-Provisional application Ser. No. 16/834,636 filed Mar. 30, 2020, now U.S. Pat. No. 11,004,149, U.S. Non-Provisional application Ser. No. 14/883,266 filed Oct. 14, 2015, now abandoned, which claims priority to U.S. Provisional Application 62/063,695 filed Oct. 14, 2014, all of which are hereby incorporated by reference in their entirety.

BACKGROUND

A. Technical Field

The present disclosure relates generally to a mobile securities trading platform, including a mobile platform for trading stock options, which mobile platform may include educational and entertainment content as well as mobile visual trade order entry, mobile portfolio view, and/or mobile stock price view.

B. Background Art

The development of online stock brokerage has led to the proliferation of computer-based brokerage and investment applications. The focus of these applications have typically been to provide sophisticated consumers with more and more complex tools to analyze investment opportunities. These tools may include complex charting, order routing and product discovery. The end result is that the average consumer is left more overwhelmed than assisted by the current investment applications.

Known trading platforms and tools generally do not provide adequate educational tools or adequate mobile tools for beginning investors, casual investors, and other investors, leaving investors of all types with tools that are too complex, cumbersome, non-mobile friendly, and generally too impractical to use on the go or through a mobile interface. Accordingly, there is a need for a more robust mobile platform for trading and managing a portfolio of diverse securities that also provides a robust set of educational tools for investors.

BRIEF SUMMARY

An objective of the present disclosure is a trading platform that overcomes the deficiencies of existing platforms and systems by providing an improved mobile platform and/or providing improved investment educational content. For example, the trading platform may be configured to provide a mobile platform interface (e.g., specifically designed and provided for mobile phones, tablets, etc.) that enables a trader (i.e., user of the platform) to review market data, review the trader's portfolio, order trades, and perform other functions. Thus, in an embodiment, the mobile platform interface may include a mobile order entry portion, a mobile portfolio view portion, a mobile stock price view portion, an investment education video programming and interactive quiz portion (which may also be provided on a non-mobile version of the platform), and a portion for following trades of other users on the platform (which may also be provided on a non-mobile version of the platform).

In an embodiment, the trading platform may be provided to a user's device by a trading platform server. The trading platform server may be configured to, among other things, perform a method for presenting securities trading information. The method may comprise providing a menu of a plurality of individuals, wherein each of the plurality of individuals is associated with a respective one or more securities trades made through a trading platform, receiving, from a user who is not one of the plurality of individuals, a selection of at least one of the plurality of individuals, and providing, for the user, a graphical display of the respective one or more securities trades made through the trading platform Other objects and advantages of the present disclosure will become apparent to one having ordinary skill in the art after reading the specification in light of the drawing figures, however, the spirit and scope of the present disclosure should not be limited to the description of the embodiments contained herein.

DETAILED DESCRIPTION

Figure 1A:
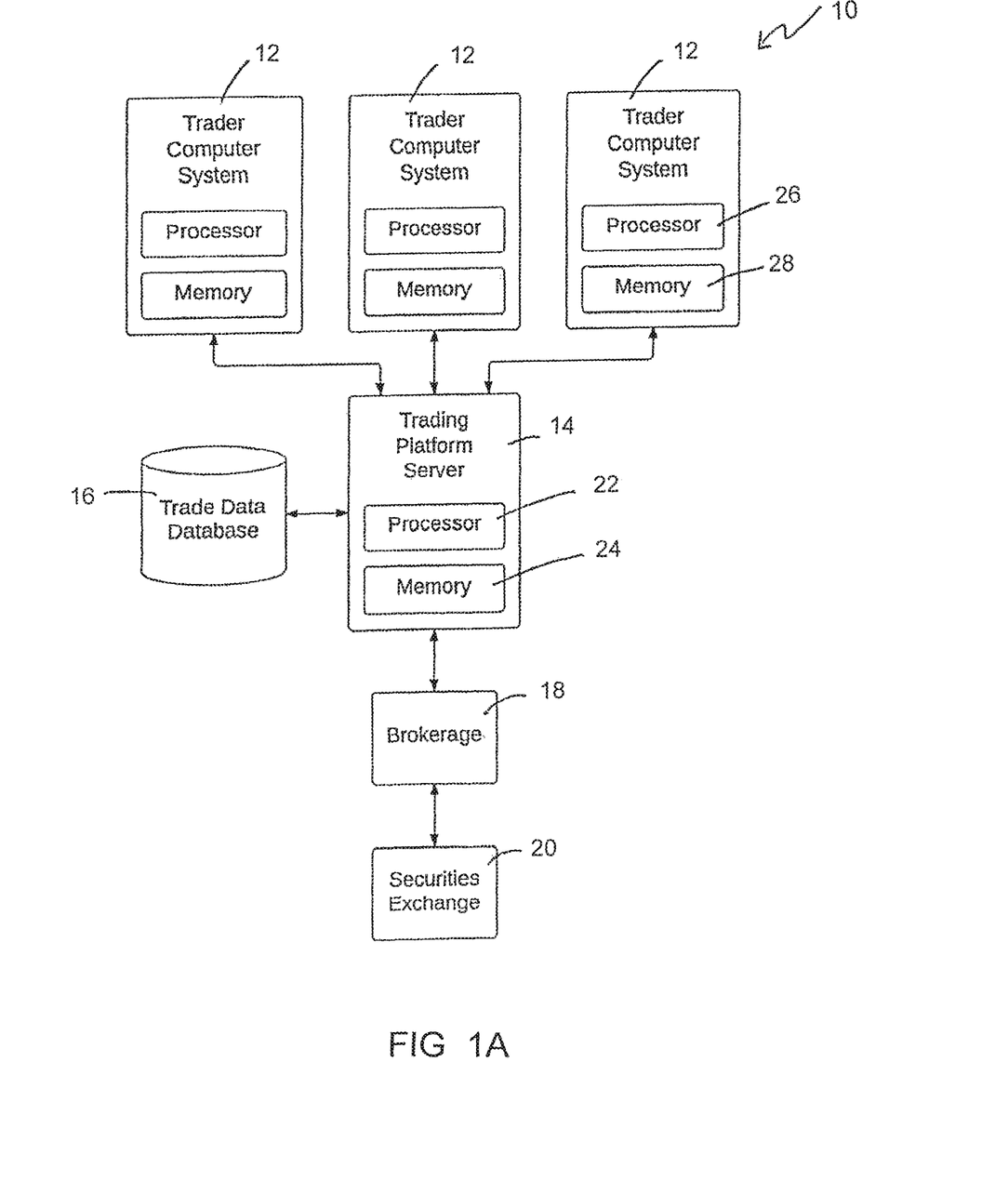
FIG. 1A is a block diagram view of an exemplary embodiment of a security trading system.

Referring to the drawings, wherein like reference numerals refer to the same or similar features in the various views, FIG. 1A is a block diagram view of an exemplary system 10 for trading securities. The system 10 may include a plurality of trader computing systems 12 (three such trader computer systems are illustrated in FIG. 1), a trading platform server 14, a trade history database 16, a brokerage 18, and a securities exchange 20.

The securities exchange 20 may be a marketplace for buying and selling securities (not shown) such as, for example only, stocks, bonds, futures, and options. The exchange 20 may be or may include an electronic marketplace, a live marketplace, or any other type of marketplace for buying and selling securities (not shown). The present disclosure will be described with reference to embodiments in which the traders purchase and sell, and the brokerage 18 facilitates the purchase and sale of, stock options. It should be understood, however, that the present disclosure is not limited to stock options. Rather, the system and methods illustrated and described herein may find use with any type of securities.

The brokerage 18 may facilitate buying and selling of stock options by traders on the exchange 20. Accordingly, the brokerage 18 may be in communication with the traders (i.e., through the trader computer systems 12 and/or the trading platform server 14, in an embodiment) and with the exchange 20. In an embodiment, the brokerage 18 may receive orders for buying and selling stock options electronically from the traders and perform the ordered trades on the exchange 20 or cause the ordered trades to be performed on the exchange 20.

Each of the trader computing systems 12 may be configured to provide access to a trading platform 10. The trading platform may be operated by a trader to, for example, order option trades on the exchange, view stock and options prices and other trading data, access educational and entertainment materials, and view data respective of one or more accounts held by the user with the brokerage 18. The trading platform may include one or more features set forth in U.S. provisional application No. 61/883,676, filed Sep. 27, 2013 ("the '676 application"), which is hereby incorporated by reference in its entirety.

A trader computing system 12 may be or may include a mobile device (e.g., a mobile phone, tablet, etc.), in an embodiment. Additionally or alternatively, a trader computing system 12 may be or may include a personal computer or other computing device.

The trading platform server 14 may be configured to perform a number of functions to assist traders in their trading decisions. For example, the trading platform server 14 may be configured to provide stock and options prices, educational and entertainment information, and other information to traders through the trader computer systems 12. Stock and options prices may be obtained by the trading platform server 14, in an embodiment, from the brokerage 18 and/or from the securities exchange 20.

The trading platform server 14 may be further configured to store data in and retrieve data from the trade data database 16. Data stored in the trade data database 16 may include records of trades ordered by traders, records of trades executed by or through the brokerage 18, historical stock and options prices, and similar information related to trading services that may be performed through the trading platform.

The database 16 may be or may include one or more data repositories including, but not limited to, one or more databases and database types as well as data storage that may not necessarily be colloquially referred to as a "database." The database 16 may be configured to store, e.g., records of trades ordered by traders, records of trades executed by or through the brokerage 18, historical stock and options prices, and similar information related to trading services that may be performed through the trading platform.

The trading platform server 14 may be in electronic communication with the trader computer systems 12 and with the brokerage 18 to obtain and deliver stock and options prices, trader orders, and other information, in an embodiment. In embodiments, the trading platform server 14 may be owned or operated by the brokerage 18. Furthermore, the trade platform server 14 may be a single server, or multiple servers acting in a redundant or additive capacity.

In embodiments, the trader computer systems 12 may be configured to perform one or more of the functions described herein with reference to the trading platform server 14 and/or the brokerage 18. Accordingly, the trader computer systems 12 may be in direct electronic communication with the brokerage 18, the trade data database 16, and/or the securities exchange 20.

The trading platform server 14 may include a processor 22 and a memory 24. The processor 22 may be any appropriate processing device. The memory 24 may be any volatile or non-volatile computer-readable memory. The memory 24 may be configured to store instructions that embody one or more steps, methods, processes, and functions of the trading platform server 14 described herein. The processor 22 may be configured to execute those instructions to perform one or more of the same steps, methods, processes, and functions.

Each of the trader computer systems 12 may also include a processor 26 and a memory 28, with three processors and three memories illustrated in FIG. 1. Each processor 26 may be any appropriate processing device. Each memory 28 may be any volatile or non-volatile computer-readable memory and may be configured to store instructions that embody one or more steps, methods, processes, and functions of the trader or trader computer system 12 described herein. The processor 26 may be configured to execute those instructions to perform one or more of the same steps, methods, processes, and functions. One or more of the trader computer systems 12 may be or may include a personal computer or mobile device (e.g., tablet, smartphone), in an embodiment.

Instead of, or in addition to, a processor 22, 26 and memory 24, 28, the trading platform server 14 and/or one or more of the trader computer systems 12 may include a programmable logic device (PLD), application-specific integrated circuit (ASIC), or other suitable processing device (not shown).

As noted above, a trader in the system may be provided with a platform for, among other things, ordering the purchase and sale of stock options, reviewing trading data, and accessing educational and entertainment information. The platform may be provided, in an embodiment, by both the trader computer system 12 and the trading platform server 14. That is, some elements or features of the platform may be installed on the trader computer system 12, and other elements or features of the platform may be provided by the trading platform server 14 (e.g., on a software-as-a-service (SaaS) basis). For example, the trader computer system 12 may provide (i.e., may have installed) a program that includes a graphical user interface of the platform, and the trading platform server 14 may provide much of the underlying data and calculations. However, storage and retrieval of data displayed in the platform 10, calculations performed by or under the platform, and services provided through the platform may be performed by one or both of the trader computer system 12 and the trading platform server 14.

The platform may include a number of features that enhance the trading experience for a trader. For example, the platform may be configured to, among other things: enable entry of trade orders through a mobile device; provide a graphical view of a user's portfolio on a mobile device; provide a graphical view of prices of stocks and other securities on a mobile device; provide investment education programming; provide modification of a trade order through a mobile device; provide closing of an order through a mobile device; and enable users to follow the trading activity of select other users. As described above, these functions may be performed by one or both of the trading platform server 14 and the trader computer system 12. For ease of discussion, these functions are described below with reference to methods comprising steps performed primarily by the trading platform server 14. It should be understood, however, that the methods described below are not restricted to performance by the trading platform server 14.

Figure 1B:
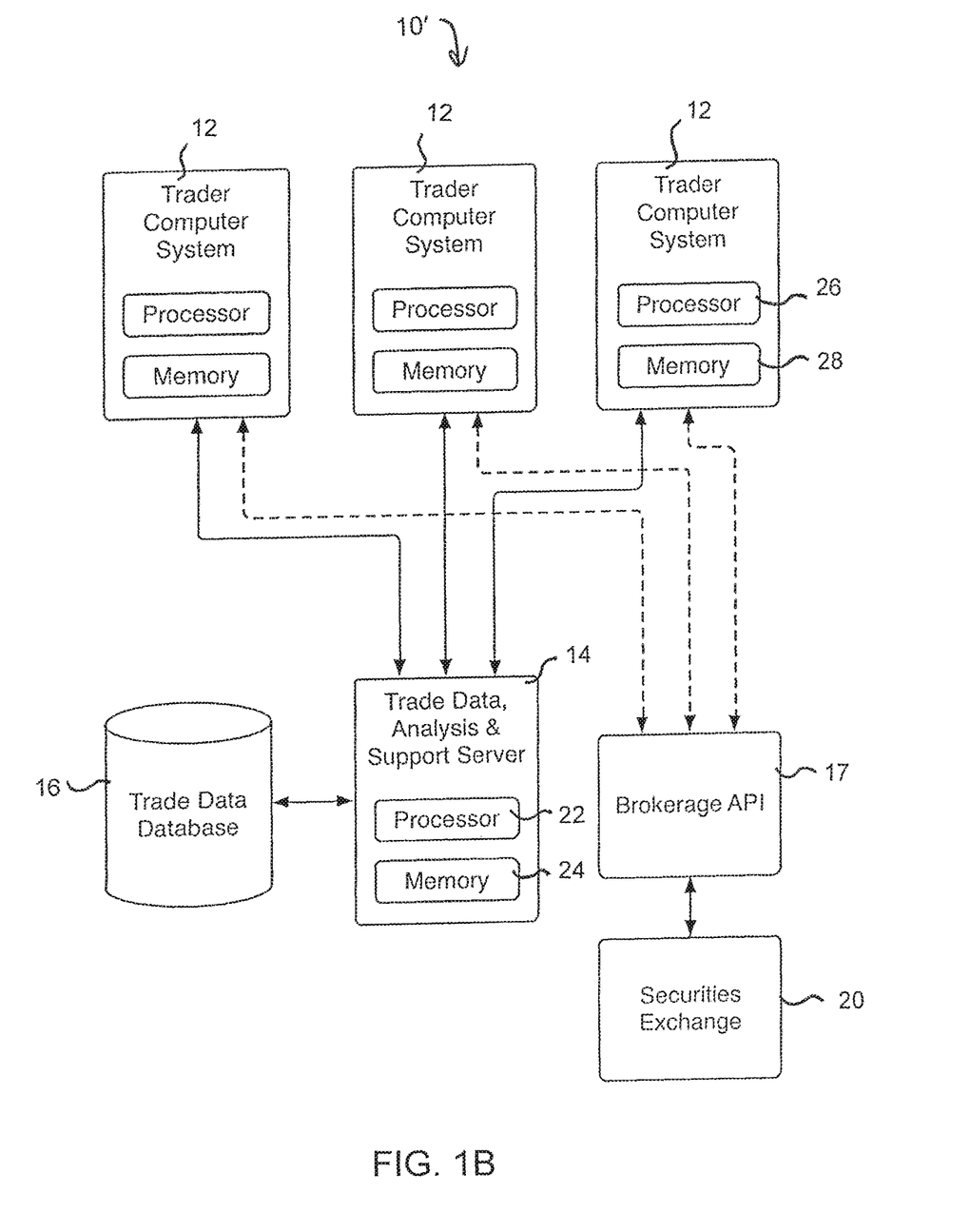
FIG. 1B is a block diagram view of an exemplary embodiment of a security trading system.

FIG. 1B is a second embodiment of a system 10' for trading securities. The system 10' may have many of the same or similar components as the system 10 illustrated in and described with respect to FIG. 1A. Accordingly, the description set forth above for such elements applies to the system 10', as well.

The system 10' may include a direct connection between one or more of the trader computer systems 12 and a brokerage application programming interface (API) 17, in an embodiment. The brokerage API may be provided, in an embodiment, by a brokerage (e.g., the brokerage 18 of FIG. 1A). The brokerage API 17 may provide access to the functions of the securities exchange 20, in an embodiment.

The brokerage API 17 may be provided by or accessed through the trading platform server 14 (illustrated in FIG. 1B as the trade data, analysis, and support server 14), in an embodiment. Thus, the trading platform server may provide access to a trading platform in which the functions of the trading platform server and the functions enabled by the brokerage API 17 are accessed by a trader through a single interface, in an embodiment.

Alternatively, the brokerage API 17 may be hosted by a server or system separate from the trading platform server 14, such as a server at a brokerage. In such an embodiment, the functionality provided by the brokerage API 17 may be accessed through an interface separate from that provided by the trading platform server 14.

Among the many capabilities of the trading platform server, the trading platform server may be configured to provide certain interfaces and features specifically for mobile devices. For example, the trading platform server may provide interfaces and features for mobile devices through a dedicated application running on the mobile devices and/or through a device-detection-based redirection module in the trading platform server or in electronic communication with the trading platform server.

Mobile Order Entry. One mobile-specific interface that may be provided is mobile order entry. The mobile order entry interface may be configured to enable a user to set up, edit, and execute an order in a quick and complete fashion using a visual interface. In an embodiment, an order may involve an order for a stock option trade.

Setting up an options trade may involve the adjustment of many different variables in order to place a trade. As stock and security markets are generally open five (5) days a week, and traders are not always by a home computer, a mobile trading solution can provide improved access and flexibility to a trader by allowing adjustment of those variables through a mobile device to place a trade order.

From the point of view of the trader, setting up a new option trade, modification of an existing trade or closing of an existing position, through a computerized platform may involve a series of steps, each of which may be enabled by a mobile order entry interface according to the present disclosure: (1) select stock symbol to trade, (2) pick a strategy/position to trade in that symbol, (3) edit the variables of the position (e.g., time to expiration, strike selection, buy/sell), (4) edit order details (price, quantity, order type) and (5) review and place or send the order.

In an embodiment, the mobile trading platform may include separate interface portions for each of above-noted steps (1)-(5). FIGS. 2-5 illustrate exemplary interface portions associated with steps (2)-(5).

Figure 2:
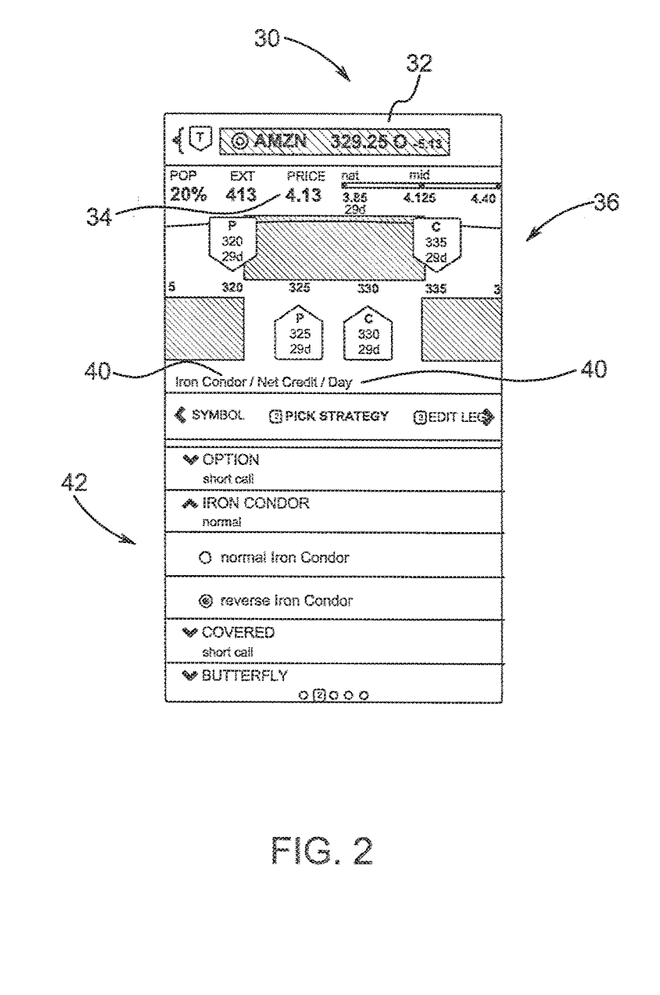
FIG. 2 illustrates an exemplary embodiment of a portion of a mobile order entry interface that may be provided in a mobile portion of a securities trading platform.

FIG. 2 illustrates an exemplary mobile interface portion 30 for picking a strategy/position to trade in for a selected symbol (referred to herein as the "strategy interface" 30). The strategy interface 30 may include a diagrammatic and spatial display for the user, in an embodiment. The strategy interface 30 may display, for example, stock price 32, option price 34, a bell curve 36 to illustrate the stock's relative price distribution for the remaining duration between the current trading day and the a given option expiration, and marks 38, 40 relative to the bell curve 36 for one and two standard deviations in the price distribution.

Referring to FIGS. 1 and 2, the data provided in the strategy interface 30 may be stored in and retrieved from the database 16, in an embodiment. Thus, in an embodiment, the trading platform server 14 may be configured to retrieve data from the database 16, including data related to the user and/or data related to one or more stocks, securities, etc., and display that data for the user in the strategy interface 30 and/or another interface described and/or illustrated in this disclosure.

In an embodiment, the trading platform server 14 may be configured to provide a set of predefined strategies 42 that the user can access in the strategy interface 30 in order to reduce the user's time spent on setting up the trade. In an embodiment, each strategy may be provided with long or short variations. When a user selects a predefined strategy and the long or short variation of that strategy, the trading platform server may set the trade up accordingly according to the current price of the selected stock, according to a probability of profit calculation, according to the expiration of the option, and/or according to the implied volatility of the option. Further discussion of a probability of profitability calculation is included in U.S. provisional application No. 61/991,683, hereby incorporated by reference in its entirety.

Figure 3:
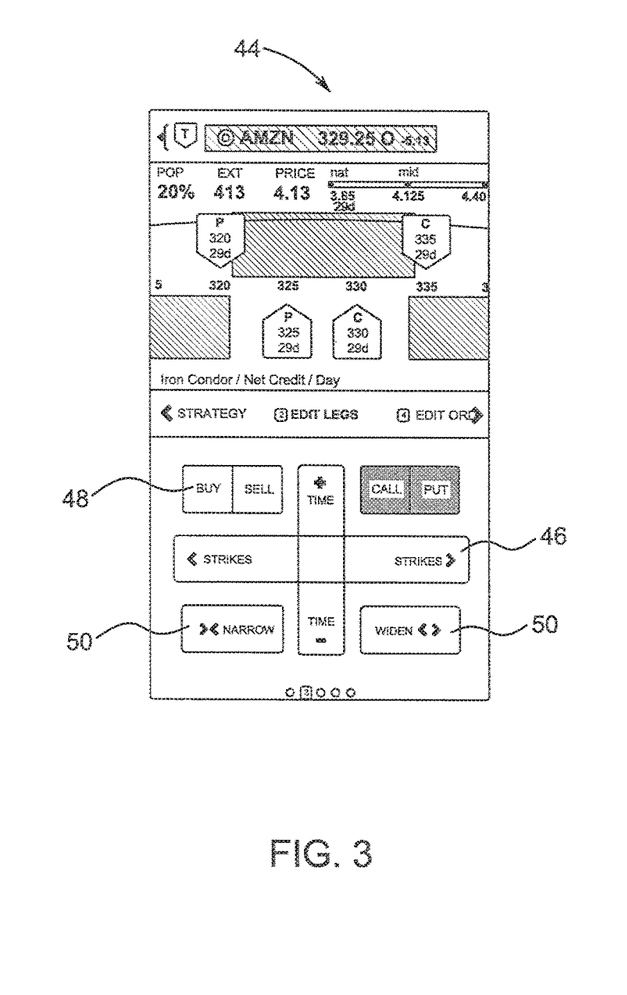
FIG. 3 illustrates an exemplary embodiment of a portion of a mobile order entry interface that may be provided in a mobile portion of a securities trading platform.

FIG. 3 illustrates an exemplary position edit interface portion 44. It is common to edit a position's variables once it has been set up and prior to sending the order. In an embodiment, the position edit interface portion 44 may enable the user to adjust position variables, without having to clear the position in its entirety, by using single touch controls. Control elements (e.g., radio buttons, sliders, increment/decrement controls, etc.) may be provided in the position edit interface portion for time, strike selection 46, buy/sell 48, and spread width 50, for example. The position edit interface portion 44 may further include a manual price entry control element, in an embodiment.

Referring to FIGS. 1 and 3, in an embodiment, for each adjustment to a position made by the user through the strategy edit interface 44, the trading platform server 14 may recalculate the user's probability of profit, extrinsic value, spread price, profit and loss zones, and the stock's price distribution curve and to present the recalculated data for the user through the strategy edit interface 44.

Figure 4:
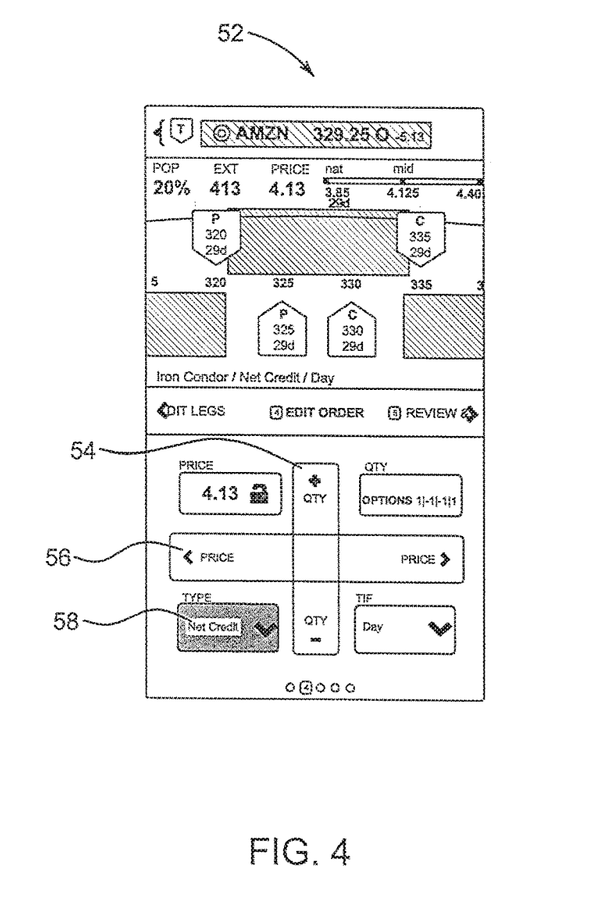
FIG. 4 illustrates an exemplary embodiment of a portion of a mobile order entry interface that may be provided in a mobile portion of a securities trading platform.

FIG. 4 illustrates an exemplary order edit interface 52. The order edit interface may enable the user to adjust the variables of the order in the same fashion that the user is able to adjust the strategy, in an embodiment. That is, the order edit interface 52 may include control elements for quantity 54, price 56, and trade type 58, for example.

Figure 5:
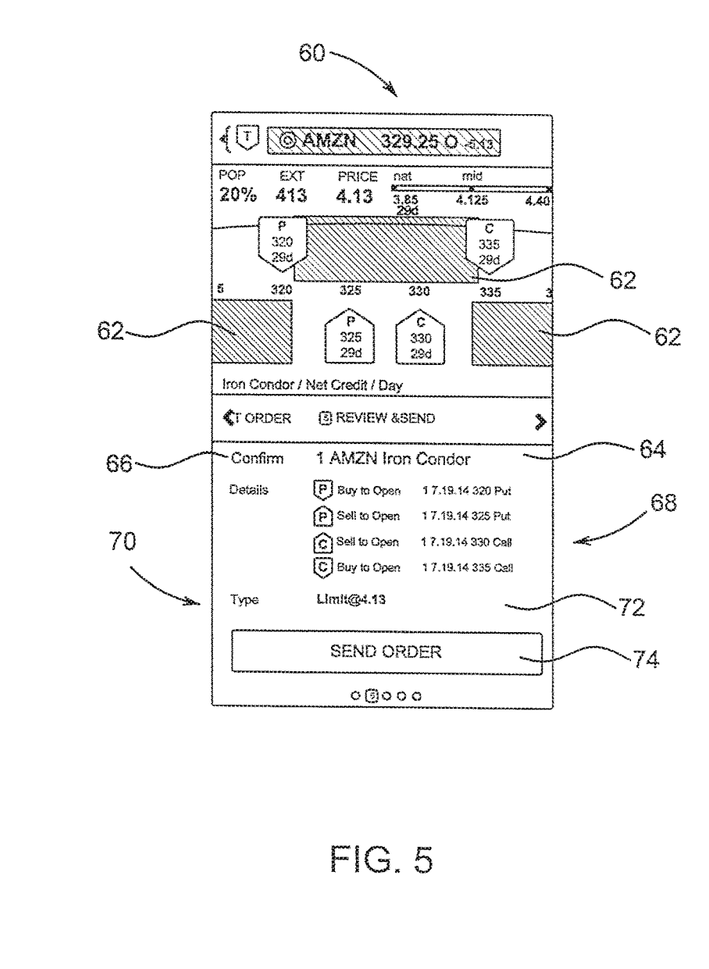
FIG. 5 illustrates an exemplary embodiment of a portion of a mobile order entry interface that may be provided in a mobile portion of a securities trading platform.

FIG. 5 illustrates an exemplary order review and placement interface 60. In an embodiment, before the user sends an order, the order review and placement interface 60 may display a diagrammatical and spatial snapshot of the trade. The order review and placement interface 60 may include portions illustrating the profit and loss zones 62 for quick evaluation of risk, strategy 64, stock symbol 66, details for each leg of the position 68, order type 70, and option price 72. The information included in the order review and placement interface 60 may provide the user with a holistic visual description of the trade before it is sent. The order review and placement interface 60 may further include an order placement control element 74. Referring to FIGS. 1 and 5, when the user selects the order placement control element 74, the trading platform server 14 may execute the trade ordered by the user through the interface portions 30, 44, 52, 60 of FIGS. 2-5.

Mobile Portfolio View. Much like the ability to place trade orders, the ability to view and easily understand a portfolio on a mobile device can greatly aid a user of the trading platform. Accordingly, referring to FIG. 1, the trading platform server 14 may be configured to provide a portfolio view interface for a user that is specifically designed and provided for a mobile device.

An exemplary portfolio view may include separate portions for viewing the portfolio and for viewing individual components (where a component may be, in an exemplary embodiment, an option or stock, or other futures or securities, held by the user) of the portfolio, in an embodiment.

Figure 6:
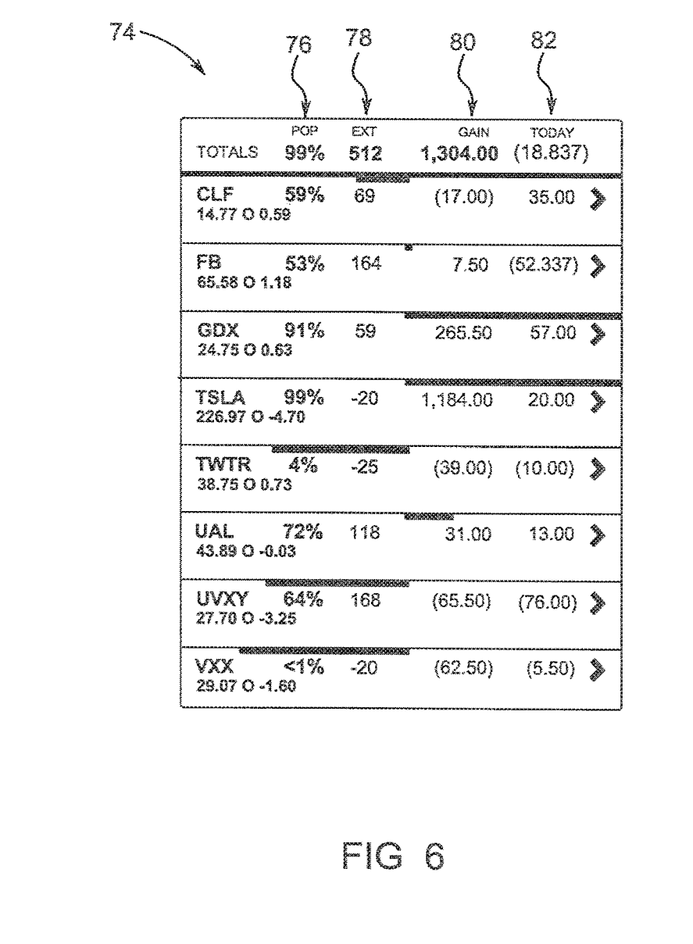
FIG. 6 illustrates an exemplary embodiment of a portion of a portfolio view interface that may be provided in a mobile portion of a securities trading platform.

FIG. 6 illustrates an exemplary portfolio view interface portion 74. The portfolio view interface portion 74 may include, in an embodiment, a list of a particular user's open stock and option positions, or other futures or other securities. The portfolio view interface portion 74 thus may provide a convenient and simplistic means to manage positions and overall risk. In an embodiment, the portfolio view interface portion 74 may include (e.g., for both each individual open position and for the portfolio as a whole), for example, a probability of profit 76, an extrinsic value 78, a total net gain 80 from existing open positions, and a net change 82 for a given period of time (e.g., for the current or most recent trading day).

Referring to FIGS. 1 and 6, the data shown in the portfolio view interface portion 74 may be retrieved from the database 16 by the trading platform server 14 and processed by the server 14 into visual depictions of the data that are presented in the portfolio view interface portion 74.

Figure 7:
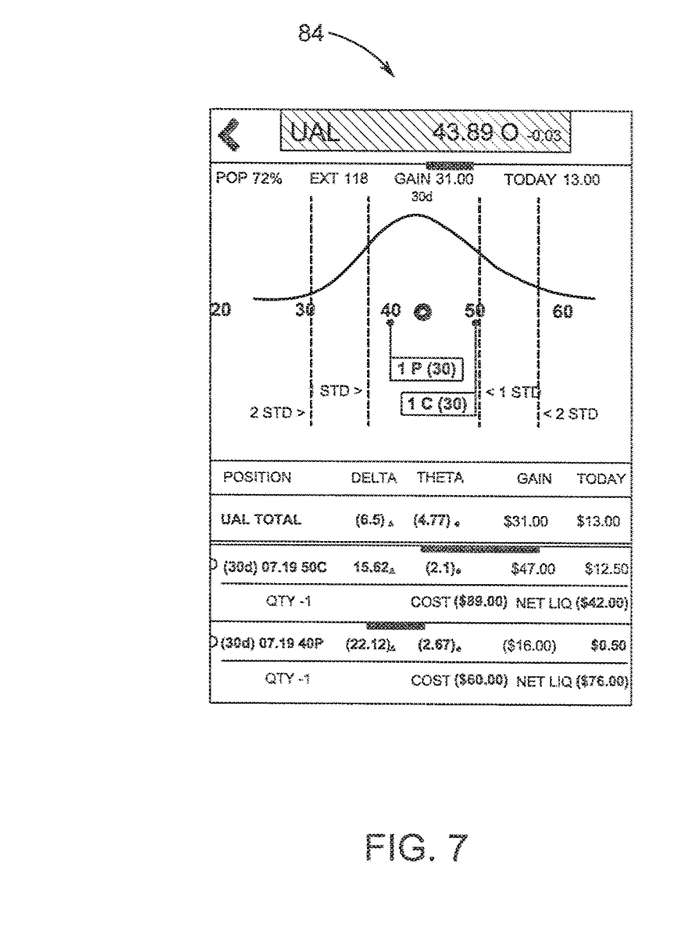
FIG. 7 is illustrates an exemplary embodiment of a portion of a portfolio view interface that may be provided in a mobile portion of a securities trading platform.

The calculation of an overall probability of profit for an individual user may be accomplished by comparing all of the user's individual positions to that of a common stock index, in an embodiment. The individual positions may be mapped to the common index through use of a correlation variable such as, for example and without limitation, Beta, to identify the approximate move that an overall index can make that would result in profitable individual positions. The visual display of their probability of profit for individual positions enables a user to gauge a level of understanding with respect to his or her portfolio's probability of success FIG. 7 illustrates an exemplary portfolio component interface portion 84. The portfolio component interface portion 84 may include information respective of a single investment in the user's portfolio (e.g., a single option or stock), in an embodiment. For example, the portfolio component interface portion 84 may include data such as, for example only, Delta 86, Theta 88, and open profit/loss 90 for the investment.

Mobile Price View. As markets trade and move every day, it can be useful for a user to view changes in stock prices on their mobile devices. Accordingly, referring to FIG. 1, the trading platform server may be configured to provide a stock price view interface portion (which may be referred to as a price view interface) for viewing prices and other information respective of stocks and securities, for example. The price view interface will be described with reference to an embodiment in which all prices are stock prices, but the price view interface is not so limited except as specified in the claims.

Figure 8:
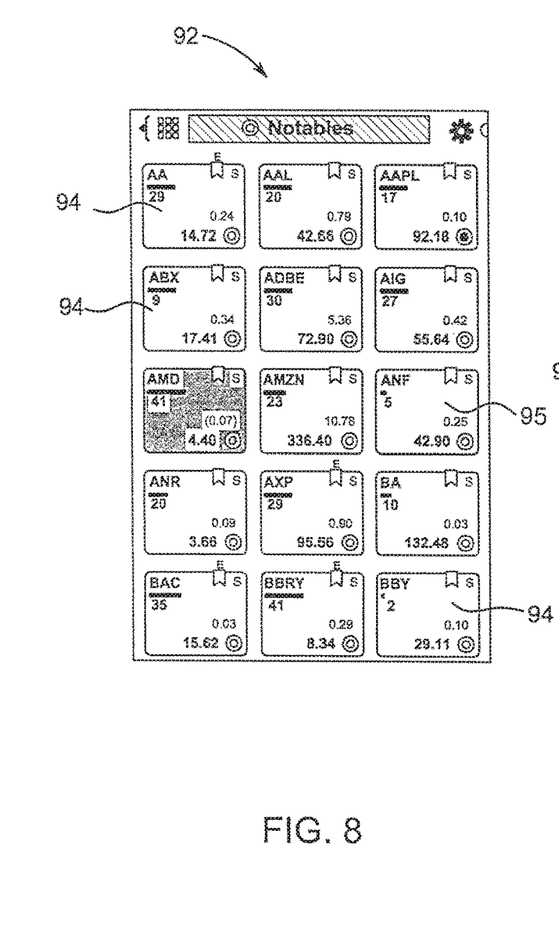
FIG. 8 illustrates an exemplary embodiment of a portion of a stock price view interface that may be provided in a mobile portion of a securities trading platform.

FIG. 8 illustrates an exemplary price view interface portion 92 including a pre-populated set of "notable" stocks. Referring to FIGS. 1 and 8, the trading platform server 14 may be configured to select particular stocks as "notable." The trading platform server 14 may also provide additional or alternative pre-populated sets of stocks for the price view interface 92.

Within the price view interface 92, in an embodiment, stocks may be shown in visual tiles 94 (for visual clarity, not all tiles 94 are indicated in FIG. 8), colored based on the change in the price of the stock during the present or most recent trading day, for example. Tiles 94 may include additional information related to the stock, such as the symbol of the stock, the price of the stock, and the change in price of the stock for the present or most recent trading day, in an embodiment.

Figure 9:
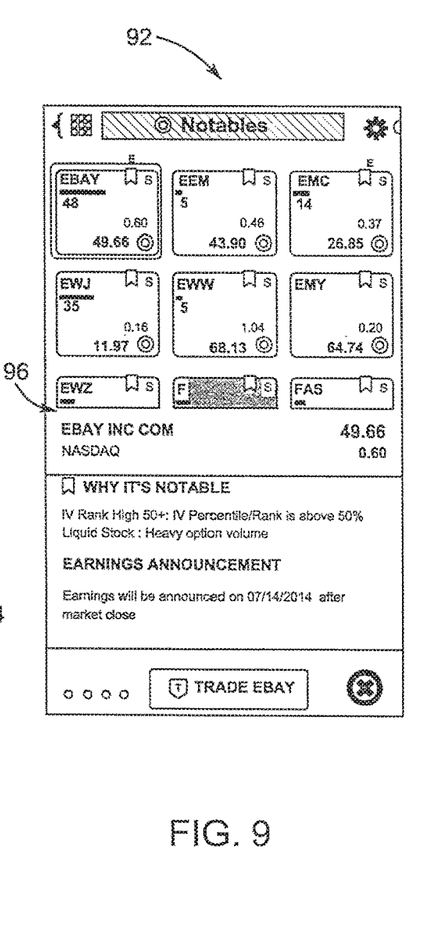
FIG. 9 illustrates an exemplary embodiment of a portion of a stock price view interface that may be provided in a mobile portion of a securities trading platform.
Figure 10:
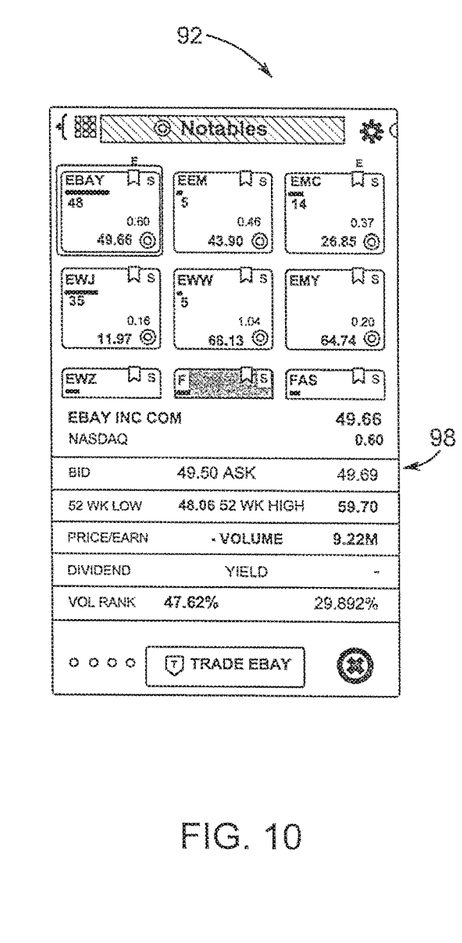
FIG. 10 illustrates an exemplary embodiment of a portion of a stock price view interface that may be provided in a mobile portion of a securities trading platform.

A user may select a stock from the price view interface portion 92 to view additional information about the stock, in an embodiment. FIGS. 9 and 10 illustrate the price view interface portion of FIG. 8, with additional information portions that may be provided. For example, as shown in FIG. 9, information 96 about the stock related to why the stock was selected for a pre-populated list may be provided. Additionally or alternatively, as shown in FIG. 10, more in-depth information 98 about the stock may be provided, such as stock symbol, the last price, net change for the day, and a percentile display. The percentile display can be indicative of the relationship between the current price and the 52-week high and low price or between the implied volatility and the 52-week historical implied volatility.

Figure 11:
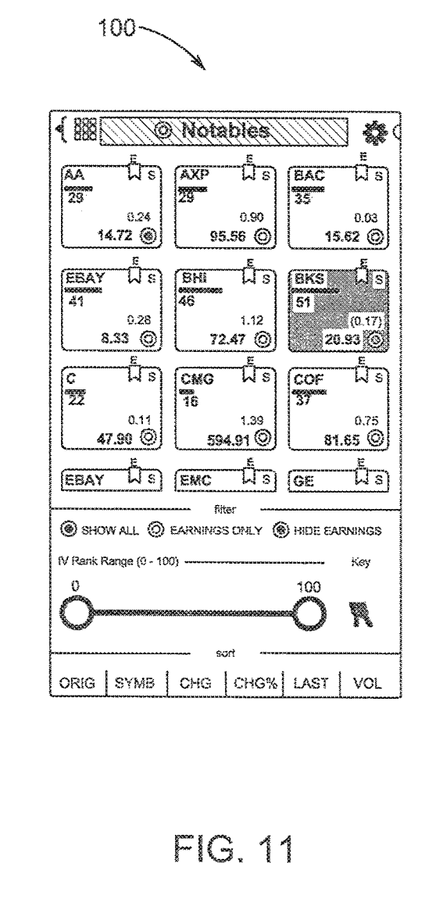
FIG. 11 illustrates an exemplary embodiment of a portion of a stock price view interface that may be provided in a mobile portion of a securities trading platform.

In addition to or instead of pre-populated lists, the price view interface may show a list of stocks selected by a user. FIG. 11 illustrates a price view interface portion 100 including stocks selected by a user. The user may select stocks for display through some other portion of the platform, in an embodiment.

Figure 12:
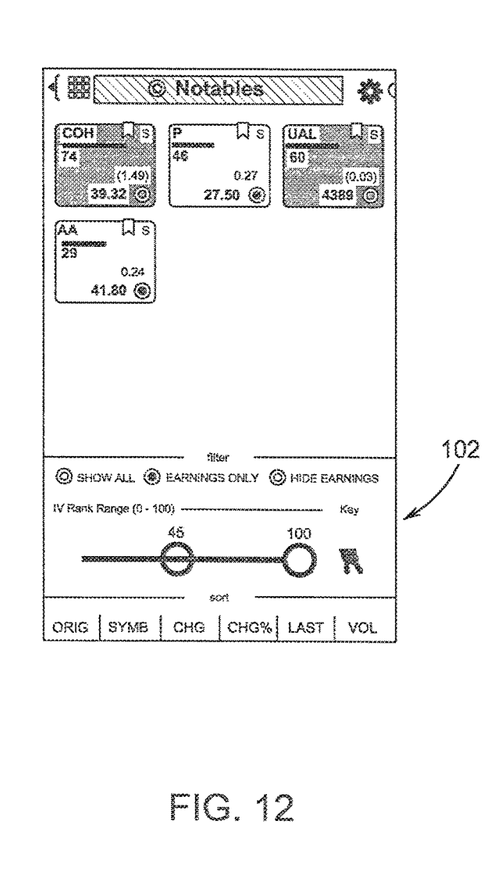
FIG. 12 illustrates an exemplary embodiment of a portion of a stock price view interface that may be provided in a mobile portion of a securities trading platform.

In both user-selected lists and pre-populated lists, the price view interface 92, 100 may include filtering tools. For example, as shown in FIG. 12, filters 102 may be related to earnings (e.g., stocks with upcoming earnings announcements) or implied volatility. Additional filters may be related to stock symbol, net change, percent change, and last price. Referring to FIGS. 1 and 12, the data used to properly process the filter requests can come from the database 14 and/or brokerage 18, and the filters may be applied to the data by the trading platform server.

Investment Education Video Programming. Referring again to FIG. 1, the trading platform server 14 may be configured to provide one or more items of investment education video programming. For example, the database 16 may store one or more investment education videos that may be streamed by a user computer system 12 through the trading platform server 14. Additionally or alternatively, the trading platform server 14 may provide a live stream of one or more investment education video feeds. The videos may be accessible from a user's PC, mobile device, etc. In an embodiment, the investment education video programming may be provided as a portion of and/or accessed through the mobile interface of the trading platform.

Instead of or in addition to more traditional investor education, the educational video programming of the trading platform may include content based on a "learn by watching others do" style of education. As a result, the educational content may be entertaining, easy to understand and actionable.

In one aspect of the educational content, users may be able to watch other real traders trading live while they discuss the trades they are making and the mechanics they adhere to when placing trades. It should be appreciated that the real traders can be users of the platform, professional traders, retail traders, or fictitious traders processed from the investment data and investment education data, for example.

In another aspect of the educational content, users may watch (e.g., the trading platform server may be configured to provide) pre-produced pieces that are designed to answer basic investment questions to better acclimate the user with some common options and trading terminology by addressing specific investor education topics, and by relaying brief synopsizes of trades made by an array of the real traders.

Displaying Trading Activity of Selected Traders. In addition to the above-described educational video content, the trading platform may provide users with a real-time trade feed consisting of real trades executed by professional traders through the trading platform, which may be referred to herein as a user "following" one or more traders. In an embodiment, the trading platform server 14 may provide real-time feeds of a diverse mix of traders with different account sizes, levels of experience, levels of risk, etc. so that different users can relate to different ones of the traders and learn from their respective trading styles.

Figure 13:
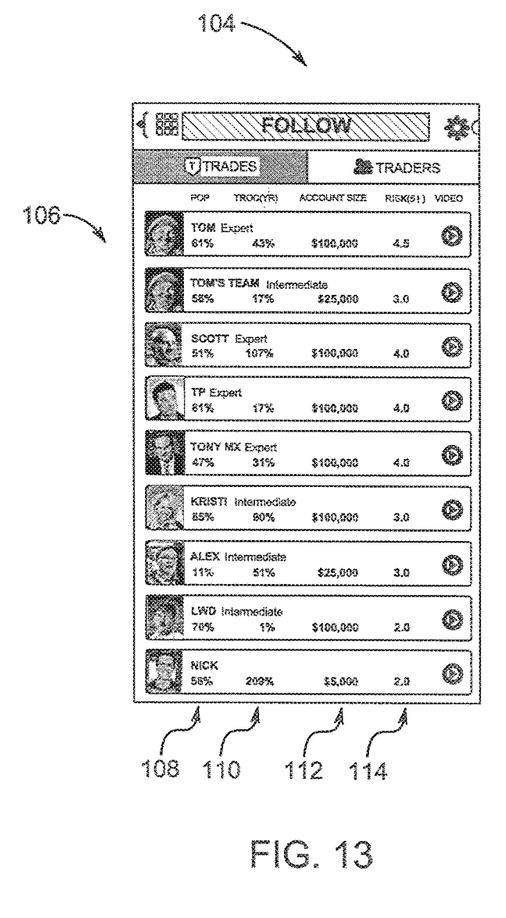
FIG. 13 illustrates an exemplary embodiment of a portion of an interface for following the trading activity of other traders that may be provided in a securities trading platform.

Referring to FIG. 1, in an embodiment, the trading platform server 14 may be configured to execute a method to provide a user with the ability to follow one or more traders on the trading platform. A first step of the method may include providing a menu of a plurality of individuals, wherein each of the plurality of individuals is associated with a respective one or more securities trades made through the trading platform. An exemplary interface 104 providing such a menu 106 (referred to herein as a trader menu 106) is illustrated in FIG. 13. As illustrated, the trader menu 106 may include a listing of traders and characteristics of the traders and/or their accounts. For example, in an embodiment, each trader's name 108, trading experience 110, account size 112, and risk tolerance 114 may be provided.

Figure 14:
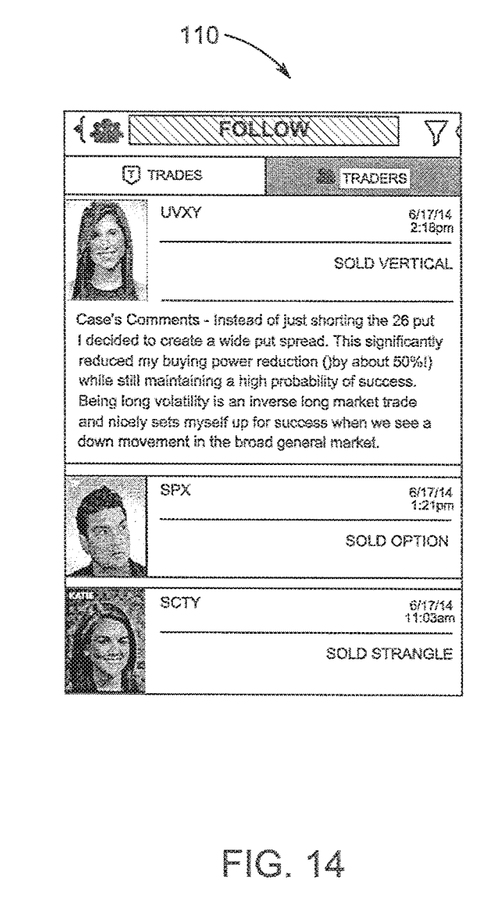
FIG. 14 illustrates an exemplary embodiment of a portion of an interface for following the trading activity of other traders that may be provided in a securities trading platform.

Additionally or alternatively, the menu of a plurality of individuals may include and/or may be sorted by a list of recent trades made by the plurality of individuals. One such exemplary menu 110 is illustrated in FIG. 14. In an embodiment, such a menu 110 may include a listing of trades, with a stock symbol and position listed for each trade. Furthermore, in an embodiment, one or more of the trade listings may include commentary from the trader. The trader commentary may include, for example, a rationale for one or more aspects of the trade.

The method may continue to a step that includes receiving, from a user who is not one of the plurality of individuals, a selection of at least one of the plurality of individuals. That is, a user of the trading platform who is not one of the professional traders may provide a selection of one or more of the professional traders to follow. A user may select one of the individuals through one of the menus 106, 110 illustrated in FIG. 13 or FIG. 14, in an embodiment. The user may select an individual trader, or may select a group of traders directly (e.g., by explicitly selecting the traders in the group) or indirectly (e.g., by applying one or more filters to the list of traders in the menu). Such filters may include only closing trades, only opening trades, trades made that day, trades made the previous day, and trades made the previous week. The server retrieves that data from the database and processes it to match the requests made by the user.

The method may further continue to a step that includes providing, for the user, a graphical display of the respective one or more securities trades made through the trading platform by the selected at least one of the plurality of individuals. For example, a list of all trades (or a subset of all trades) made by the selected one or more traders may be provided. For each trade, information related to the trade may be provided, such as trade structure, type of strategy, probability of profit, time of trade, underlying quote, visual snapshots of the diagrammatical and spatial display of the trade at the time it was sent, and related diagrams, for example.

In addition to a list of trades made by one or more traders, the follow feature may include biographical information about the traders, trade commentary from the traders, and/or additional data for any given stock and/or option position of the one or more traders.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment," or "in an embodiment", or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation given that such combination is not illogical or non-functional.

Although numerous embodiments of this invention have been described above with a certain degree of particularity, those skilled in the art could make numerous alterations to the disclosed embodiments without departing from the spirit or scope of this disclosure. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the any aspect of the disclosure. As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A method for presenting securities trading information to a user of a trading platform, the method comprising:
   a) providing a menu of a plurality of individuals to said user of said trading platform, wherein each of the plurality of individuals is associated with a respective one or more securities trades made through said trading platform;
   b) receiving, from said user of said trading platform, a selection of at least one of the plurality of individuals;
   c) providing, for said user of said trading platform, a graphical display of the respective one or more securities trades made through the trading platform, said graphical display comprising at least one of a closing trade, an opening trade, a trade made that day, a trade made the previous day, and a trade made the previous week, pertaining to said one or more securities trades made through the trading platform;
   d) providing, for said user of said trading platform, an investment information programming through said trading platform;
   e) displaying, for said user of said trading platform, a first graphical display of a user's position through the trading platform;
   f) providing, for said user of said trading platform, a plurality of predetermined strategies through the trading platform;
   g) providing, for said user of said trading platform, a strategy edit interface, said strategy edit interface assisting said user to edit said user's position without clearing out a previous user's position each time an edit is provided;
   h) recalculating said user's position to create a new user's position, said recalculation of user's position based on user's adjustment to user's previous position using at least one of probability of profit, extrinsic value, spread price, profit and loss zones and stock price distribution curve to generate said new user's position;
   i) displaying, for said user of said trading platform, a second graphical display of said new user's position through the trading platform.

2. The method for presenting securities trading information to a user of a trading platform of claim 1, wherein said investment information programming comprises one or more investment information videos.

3. The method for presenting securities trading information to a user of a trading platform of claim 1, wherein said investment information programming comprises a live stream of an investment education video feed.

4. The method for presenting securities trading information to a user of a trading platform of claim 1, wherein said investment information programming comprises video of one or more trading individuals, trading in real time and communicating over said trading platform about the security trades being made in real time.

5. The method for presenting securities trading information to a user of a trading platform of claim 1, wherein the providing, for said user, said graphical display of the respective one or more securities trades made through the trading platform occurs in real time.

6. The method for presenting securities trading information to a user of a trading platform of claim 1, wherein the providing, for said user, said investment information programming through said trading platform occurs in real time.

7. The method for presenting securities trading information to a user of a trading platform of claim 1, further comprising providing commentary from each of the plurality of individuals pertaining to a rationale for the one or more securities trades.

8. The method for presenting securities trading information to a user of a trading platform of claim 1, wherein said plurality of predetermined strategies comprises a long variation and a short variation.

9. A non-transitory, computer-readable memory storing instructions that, when executed by a processor, cause the processor to perform a method for presenting securities trading information pertaining to securities trades made through a trading platform to a user of said trading platform, the method comprising:
   a) collecting information respective of one or more transactions related to securities trading made by a plurality of individual traders through said trading platform;
   b) collecting characteristics of each of said plurality of individual traders;
   c) generating a graphical display of said one or more transactions related to securities trading made by said plurality of individual traders, said graphical display comprising at least one of a closing trade, an opening trade, a trade made that day, a trade made the previous day, and a trade made the previous week, pertaining to said one or more transactions related to securities trading made through the trading platform;
   d) displaying said graphical display to said user of said trading platform;

e) listing said characteristics of each of said plurality of individual traders to said user of said trading platform;
f) receiving from said user of said trading platform a selection of at least one of said plurality of individual traders;
g) providing to said user of said trading platform, securities trading information pertaining to the one or more securities trading transactions of said at least one of said plurality of individual traders selected by said user of said trading platform;
h) displaying, for said user of said trading platform, a first graphical display of a user's position through the trading platform;
i) providing, for said user of said trading platform, a plurality of predetermined strategies through the trading platform;
j) providing, for said user of said trading platform, a strategy edit interface, said strategy edit interface assisting said user to edit said user's position without clearing out a previous user's position each time an edit is provided;
k) recalculating said user's position to create a new user's position, said recalculation of user's position based on user's adjustment to user's previous position using at least one of probability of profit, extrinsic value, spread price, profit and loss zones and stock price distribution curve to generate said new user's position; and
l) Displaying, for said user of said trading platform, a second graphical display of said new user's position through the trading platform.

10. The non-transitory, computer-readable memory of claim 9, wherein the characteristics of each of said plurality of individual traders includes one or more of a name, trading experience, account size, and risk tolerance.

11. The non-transitory, computer-readable memory of claim 9, wherein the providing to said user of said trading platform a graphical display occurs in real time.

12. The non-transitory, computer-readable memory of claim 9, wherein said at least one of said plurality of individual traders selected by said user of said trading platform provides a rationale for a particular transaction.

13. The non-transitory, computer-readable medium of claim 9, wherein the securities trading information comprises a graphical display of the one or more securities trading transactions of said at least one of said plurality of individual traders selected by said user of said trading platform.

14. The non-transitory, computer-readable medium of claim 9, wherein the securities trading information comprises a listing of the one or more securities trading transactions of said at least one of said plurality of individual traders selected by said user of said trading platform.

15. The non-transitory, computer-readable medium of claim 9, wherein the securities trading information comprises one or more of trade structure, type of trade, probability of profit, time of trade, underlying quote visual snapshots of the diagrammatical and spatial display of the trade at the time it was sent, of the one or more securities trading transactions of said at least one of said plurality of individual traders selected by said user of said trading platform.

16. The non-transitory, computer-readable medium of claim 9, wherein the securities trading information comprises one or more of biographical information of, trade commentary by, additional data for a related stock or option of the one or more securities trading transactions of said at least one of said plurality of individual traders selected by said user of said trading platform.

17. The non-transitory, computer-readable memory of claim 9, wherein said characteristics of each of said plurality of individual traders comprises commentary pertaining to a rationale for the one or more transactions related to securities trading.

18. The non-transitory, computer-readable memory of claim 9, wherein said plurality of predetermined strategies comprises a long variation and a short variation.

* * * * *